Sept. 30, 1969   KENICHIRO KATSUKI ET AL   3,470,289
METHOD OF MANUFACTURING A CORELESS ROTOR
Filed April 9, 1965
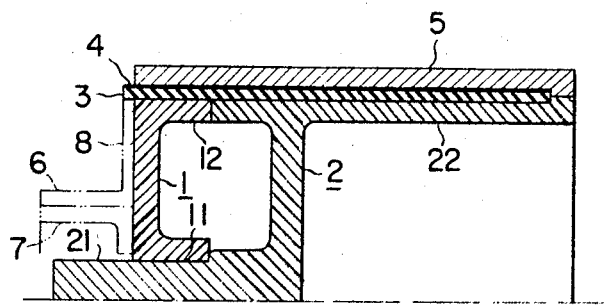

United States Patent Office 3,470,289
Patented Sept. 30, 1969

3,470,289
METHOD OF MANUFACTURING A CORELESS ROTOR
Kenichiro Katsuki, Hiroshi Kawakami, and Juichi Tatsumi, Musashi-machi, Japan, assignors to Societe d'Electronique et d'Automatisme, Courbevoie, Hauts-de-Seine, France
Filed Apr. 9, 1965, Ser. No. 446,954
Claims priority, application Japan, Apr. 10, 1964, 39/20,196
Int. Cl. B29d 3/00; B29c 1/12
U.S. Cl. 264—229        5 Claims

ABSTRACT OF THE DISCLOSURE

An annular cup-shaped coreless rotor for a dynamo electric machine supported by an annular carrier at only one end thereof is formed by first placing the windings on the carrier and also on a concentrically arranged inner mold of the same diameter as the carrier. The winding is then taped, for example with glass fiber tape of high tensile strength, and an outer mold is placed around the carrier, the winding and the inner mold. The rotor is then subjected to a vacuum impregnation step with a thermosetting resin such as an epoxy resin. The inner mold is formed of a material having a higher linear coefficient of thermal expansion than that of the winding conductors or of the outer mold so that when heated to set the resin, the winding is radially expanded placing the tape in tension.

---

The present invention concerns improvements in or relating to coreless rotors, for dynamo electric machines and particularly rotors of the so-called cup-shaped type as the winding thereof is only supported by one end thereof for rotation around a shaft.

A prior art method of manufacturing such a coreless rotor comprises the steps of inserting a preformed winding into a mold and thereafter pouring an insulating synthetic resin into said mold, thus forming a winding support and a mold winding support. However, the coherence between the winding conductors is difficult to achieve, thus resulting in deformation due to centrifugal force in high speed rotation and/or due to heating, and/or in damages due to aging of the synthetic resin employed. Consequently such a component has poor reliability and it can be only used in low power and relatively low speed machines.

It is an object of the present invention to provide a new and improved method of manufacturing a coreless rotor wherefrom the above-mentioned defects are eliminated and which, on the other hand, rotors of high mechanical strength are obtained which may be used even in high power and high rotation speed machines.

According to the invention, a method of manufacturing a coreless rotor comprises the steps of placing a winding around a winding carrier and the periphery of a cylindrical inside mold having the same diameter and mounted on the same axis as said winding carrier, securing said winding on said carrier with insulating tape, placing an outisde mold of a given inside diameter on said winding, and forming said winding into a cylinder by impregnating said winding with thermosetting synthetic resin and applying heat to the thus assembled parts to cure and set the resin and thus fastening said winding and winding carrier together under the pressure exerted from the higher thermal expansion of said inside mold, and thereafter removing the said inside and outside molds from the winding.

According to a further feature of the invention, the material of said inside mold is made of a material having a thermal expansion coefficient of more than $1.5 \times 10^{-5}$ per degree C., such for instance as aluminium or a zinciferous alloy.

A preferred embodiment of the invention is illustrated on the single figure of the accompanying drawings, the description of which will give a full understanding of the reduction to practice of the manufacturing method which is the subject of the invention.

A winding carrier 1 is in the form of an annular member, flange shaped in cross section, having a hole adapted to fix a rotary shaft in the central part thereof and a carrier part 12 adapted to support a winding on its periphery. An inside mold 2 is made of a material having a larger thermal expansion coefficient than that of the winding conductors and, for instance, a thermal expansion coefficient of more than $1.5 \times 10^{-5}$ per degree C., such as aluminium or a zinciferous alloy and is mounted on the same axis as said winding support by any suitable procedure, for example by fitting a shaft part 21 thereof into the hole 11 of said winding support. The cylindrical part 22 of said inside mold 2 has the same diameter as that of the periphery of the carrier, without any aperture being thus formed in said periphery 12 of said winding support 1.

The winding 3 is made of two layers of half-turns electrically interconnected from layer to layer and which are formed respectively on two surfaces of a thin insulating cylinder, for instance by using the so-called printed-circuit techniques. Such a winding 3 is applied directly or through the medium of a suitable insulating material on said cylindrical surface formed by said inside mold 2 and said winding support 1.

The winding 3 thus applied is fastened by winding an insulating tape 4 of a high tensile strength such as a glass fiber tape around the periphery of the winding body. An outside mold 5 has the shape of a hollow cylinder having a given inside diameter. The thermal expansion coefficient of said outside mold can be smaller than that of said inside mold 2. For instance, the outside mold may be made of steel. Said outside mold is longitudinally divided suitably into parts to facilitate its mounting and dismounting around and from the winding 3 and tape fastener 4.

The assembly which is thus obtained is first submitted to a vacuum impregnation with a thermosetting resin such for instance as an epoxy resin and then is heated in a thermosetting oven. Since said inside mold is made of a material having a larger thermal expansion coefficient than that of the material of the conductors, such as copper, said synthetic resin sets while said outside insulating tape is under mechanical tension and said winding is radially expanded against said outside mold. As a result, after setting of the resin, the winding has a strong resistance against centrifugal force or against the deformation due to heating, and consequently said winding is quite reliable and durable in use. In the course of setting of the resin, said winding 3 and said winding support 1 are caused strongly to adhere to each other to form a unitary structure. Said outside mold 5 can then easily be divided and dismounted, and said inside mold 2 can also be easily dismounted after its cooling and retraction.

A commutator made of segments 6 and supports 7 and risers 8 connecting said segments 6 and said winding is, when required, affixed upon said winding support 1, the risers being connected with winding conductor ends. A shaft (not shown) is fixed into the hole 11 of said support 1, for completing the rotor structure.

As will be clear from the above, in a coreless rotor according to the invention, the winding having on its periphery an insulating tape of a high tensile strength such as a glass fiber tape wound thereon is expanded outwardly through heating of the inside mold of a higher thermal expansion coefficient and the thermosetting resin is made to set while the insulating tape is maintained under a tensile force. Coreless rotors when manufactured by the prior art process were relatively structurally weak whereas those manufactured in accordance with the present invention demonstrate a very substantial structural strength and therefore reliability. Consequently, rotors of the present invention can be used in a rotary dynamo electric machine of relatively large power and high speed.

Of course, the present invention is not limited to the case in which printed circuit technique is utilised for making the winding proper, but it can as well be applied to the manufacture of coreless rotors in which the winding is made of suitable insulated wires formed as a plural winding layers or of bare wires glued over the face or faces of a cylindrical board.

What is claimed is:

1. A method of manufacturing a coreless rotor for an electric rotary machine in which the rotor includes conductors disposed to form an electrical winding, the steps comprising:
   (a) positioning an annular winding carrier and a cylindrical inner mold having the same diameter as said carrier in coaxially abutting relationship, the material of said mold having a higher thermal coefficient of expansion than the winding to be applied to the carrier;
   (b) placing a winding around said carrier and said mold;
   (c) securing the thus placed winding by wrapping it with insulating tape;
   (d) placing an outer annular mold around the thus assembled carrier, inner mold, winding and tape;
   (e) impregnating said widing and tape with a thermosetting resin;
   (f) heating the thus assembled parts to set said resin and secure said winding to said carrier and tape while simultaneously placing said tape in tension due to expansion of said inner mold pressing radially outward on said winding; and
   (g) finally removing said inner and outer molds from the thus finished rotor.

2. A method according to claim 1, wherein the thermal expansion coefficient of said inside mold is higher than $1.5 \times 10^{-5}$ per centigrade degree.

3. A method according to claim 1, wherein the material of said tape is made of glass fiber.

4. A method as defined by claim 1 wherein said inside mold is formed of aluminum.

5. A method according to claim 1 wherein said inside mold is formed of a zinciferous alloy.

References Cited

UNITED STATES PATENTS

| | | | |
|---|---|---|---|
| 2,983,964 | 5/1961 | Vocht | 264—135 X |
| 3,316,337 | 4/1967 | North | 264—313 |
| 3,165,569 | 1/1965 | Bright | 264—313 |
| 3,041,673 | 7/1962 | Goodwine | 264—313 |
| 3,058,165 | 10/1962 | Purvis | 264—313 |

ROBERT F. WHITE, Primary Examiner

J. H. SILBAUGH, Assistant Examiner

U.S. Cl. X.R.

264—259, 313